United States Patent [19]

Baluch et al.

[11] Patent Number: 4,571,319

[45] Date of Patent: Feb. 18, 1986

[54] METHOD AND APPARATUS FOR PRODUCING POLYMER ARTICLES HAVING DIFFERENT PROPERTIES IN DIFFERENT REGIONS OF THE ARTICLES

[75] Inventors: Donald T. Baluch, Troy; Paton M. Zimmerman, Jr., Detroit, both of Mich.

[73] Assignee: General Motors Corporation, Detroit, Mich.

[21] Appl. No.: 596,945

[22] Filed: Apr. 5, 1984

[51] Int. Cl.$^4$ .................... B29C 67/22; B29C 39/12; B29C 39/44

[52] U.S. Cl. .................... 264/40.1; 264/45.1; 264/53; 264/255; 425/145; 425/817 R

[58] Field of Search .................... 264/328.6, 40.1, 54, 264/53, 45.1, 255; 425/145, 817 R

[56] References Cited

U.S. PATENT DOCUMENTS

| | | | |
|---|---|---|---|
| 3,020,587 | 2/1962 | Alderfer et al. | 264/45.1 |
| 3,064,173 | 11/1962 | Breen et al. | 318/312 |
| 3,219,046 | 11/1965 | Waugh | 137/8 |
| 3,231,801 | 1/1966 | Lang | 318/8 |
| 3,257,149 | 6/1966 | Fruchte et al. | 264/45.1 X |
| 3,410,293 | 11/1968 | Ernyei | 137/112 |
| 3,478,767 | 11/1969 | Kister | 137/88 |
| 3,606,903 | 9/1971 | Porter et al. | 137/88 |
| 3,707,747 | 11/1972 | Porter et al. | 425/4 |
| 3,801,684 | 4/1974 | Schrewe et al. | 264/40 |
| 3,888,612 | 6/1975 | Schrewe et al. | 425/130 |
| 3,984,510 | 10/1976 | Chandra et al. | 264/40.1 |
| 4,073,839 | 2/1978 | Burkholder et al. | 264/45.1 |
| 4,176,672 | 12/1979 | Borberg | 137/99 |
| 4,199,303 | 4/1980 | Gusmer et al. | 417/216 |
| 4,312,820 | 1/1982 | Arnold et al. | 264/40.1 |
| 4,317,791 | 3/1982 | Lüdke et al. | 264/40.1 X |
| 4,328,549 | 5/1982 | Avery | 364/469 |
| 4,379,856 | 4/1983 | Samaritter et al. | 264/45.1 X |
| 4,399,105 | 8/1983 | Tilgner et al. | 264/40.1 X |

FOREIGN PATENT DOCUMENTS 58-96530 6/1983 Japan .................... 264/45.1

OTHER PUBLICATIONS

"Automobile Seats in Engineering Plastics", by Dr. Hans-Albrecht Freitag, *Bayer at Sitev '81 in Geneva*, Bayer AG, May 1981, 23 pages.

*Primary Examiner*—Philip Anderson
*Attorney, Agent, or Firm*—Warren D. Hill

[57] ABSTRACT

The specification describes urethane foam automobile seats having variable firmness or density or varying in some other property from one portion of a seat to another by combining several hardenable precursor constituents in a predetermined ratio and discharging the resulting mixture through a single nozzle into a predetermined place in the mold and then changing the constituents and/or ratios of the constituents as the mixture discharges into other parts of the mold to produce the desired property in each part of the seat. The mixing of the various constituents is under the control of a computer programmed to deliver to each mold a series of shots of the polymer mixture, each constituent being supplied at the proper rate, and gradually and simultaneously changing the flow of each constituent at the beginning and end of each shot to maintain a consistent ratio within each shot yet allowing a change of ratios from one shot to the next.

8 Claims, 9 Drawing Figures

METHOD AND APPARATUS FOR PRODUCING POLYMER ARTICLES HAVING DIFFERENT PROPERTIES IN DIFFERENT REGIONS OF THE ARTICLES

This invention relates to a method and apparatus for producing a molded polymer article having different properties in different regions of the article and more particularly to such a method and apparatus wherein a plurality of shots of polymer are sequentially formed to comprise the charge to a mold.

The standard procedure for forming molded polymer articles is to mix the hardenable precursor constituents in a predetermined ratio calculated to yield the desired properties in the product and to discharge the polymer mixture into a mold for forming the article. All portions of the article then would have the same properties. Where it is desirable to have the properties vary from one portion of the article to another, then it is necessary to place polymer mixtures of different constituent ratios in different parts of the mold to obtain the desired variation in properties. For example, in the case of automobile seat cushions it is desired to have firm lateral edges on the seat and a soft center. Such seats have been obtained by separately molding the edges and center portions and then gluing them together or by molding inserts of hard or soft material in the main foam seat. These require separate molding stages for the inserts and the remainder of the seat. It has been proposed to mold a seat of variable density or hardness of foam in a single stage utilizing a number of mixing heads with separate discharge nozzles for charging separate parts of a mold and then foaming the material. Such an arrangement requires duplication of metering, mixing and discharge apparatus and the controls therefor for each desired polymer property. It would be desirable however to obtain the variable properties in a single article or variations from one article to another using only a single metering, mixing and discharge arrangement.

It is therefore a general object of this invention to provide a method and apparatus for producing a molded polymer article with variable properties using only a single metering, mixing and discharge device for supplying different polymer mixtures to different portions of a mold.

It is a further object of the invention to provide the method and apparatus for sequentially forming a plurality of shots of polymer formed of different mixtures or different ratios of precursor constituents to produce a molded article having different properties in different regions.

The invention is carried out by the method of delivering precursor constituents to a mixing head at predetermined rates for mixing and discharging into a mold to form a polymer with a first property and changing the relative rates of the constituents to obtain another mixture for discharging into the mold which results in a polymer with a second property so that the molded article will have regions of different properties. The invention is further carried out by forming a plurality of shots of polymer of different ratios or kinds of constituents wherein each shot is formed by establishing demand count rates for each constituent, simultaneously and gradually changing the count rates at the beginning and end of each shot, controlling the flow of each constituent to rates representing and tracking the established count rates, and forming new demand count rates for other shots which result in the change of at least some of the flow rates to obtain new mixtures or constituent ratios, thereby providing to a mold mixtures for producing different properties at different parts of the molded article.

The invention further contemplates an apparatus for carrying out the above method using a pump for supplying each constituent to the mixing head, a control, a feedback responsive to the flow of each constituent, a computer for receiving and storing data specifying the constituent amounts for each shot of polymer, the computer being programmed to establish the demand values and to change the demand values as required to set the constituent ratios for each of a plurality of shots to make the change from one shot to another, and a controller responsive to the computer and to the feedback to control each pump to deliver the desired amounts of constituents to the mixing head so that the mixture discharged from the nozzle is established by the computer.

The above and other advantages of the invention will be made more apparent from the following specification taken in conjunction with the accompanying drawings wherein like reference numerals refer to like parts and wherein.

Figure 4:
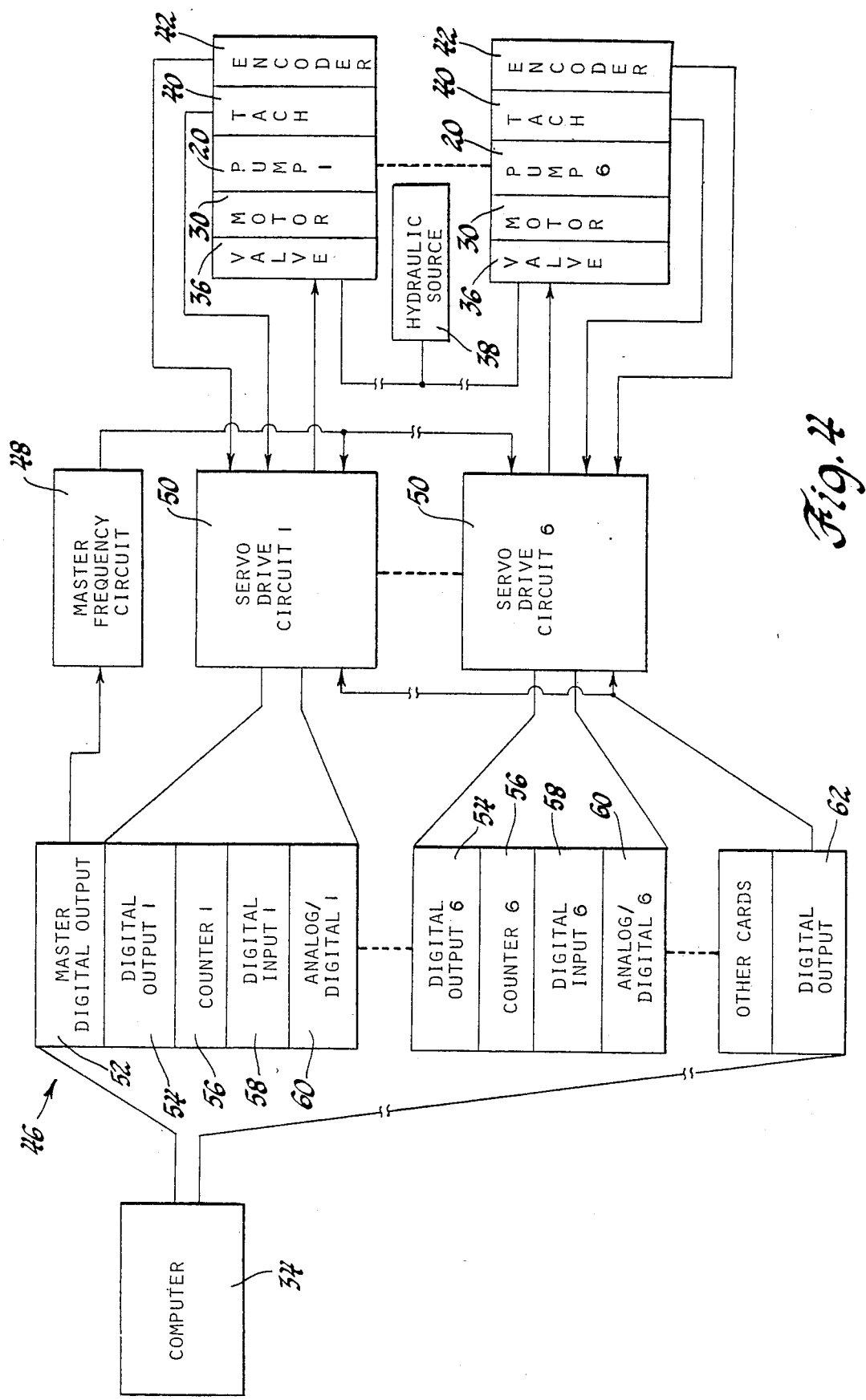
FIG. 4 is a block diagram showing the computer and a controller for controlling the pumps of FIG. 3.
Figure 5:
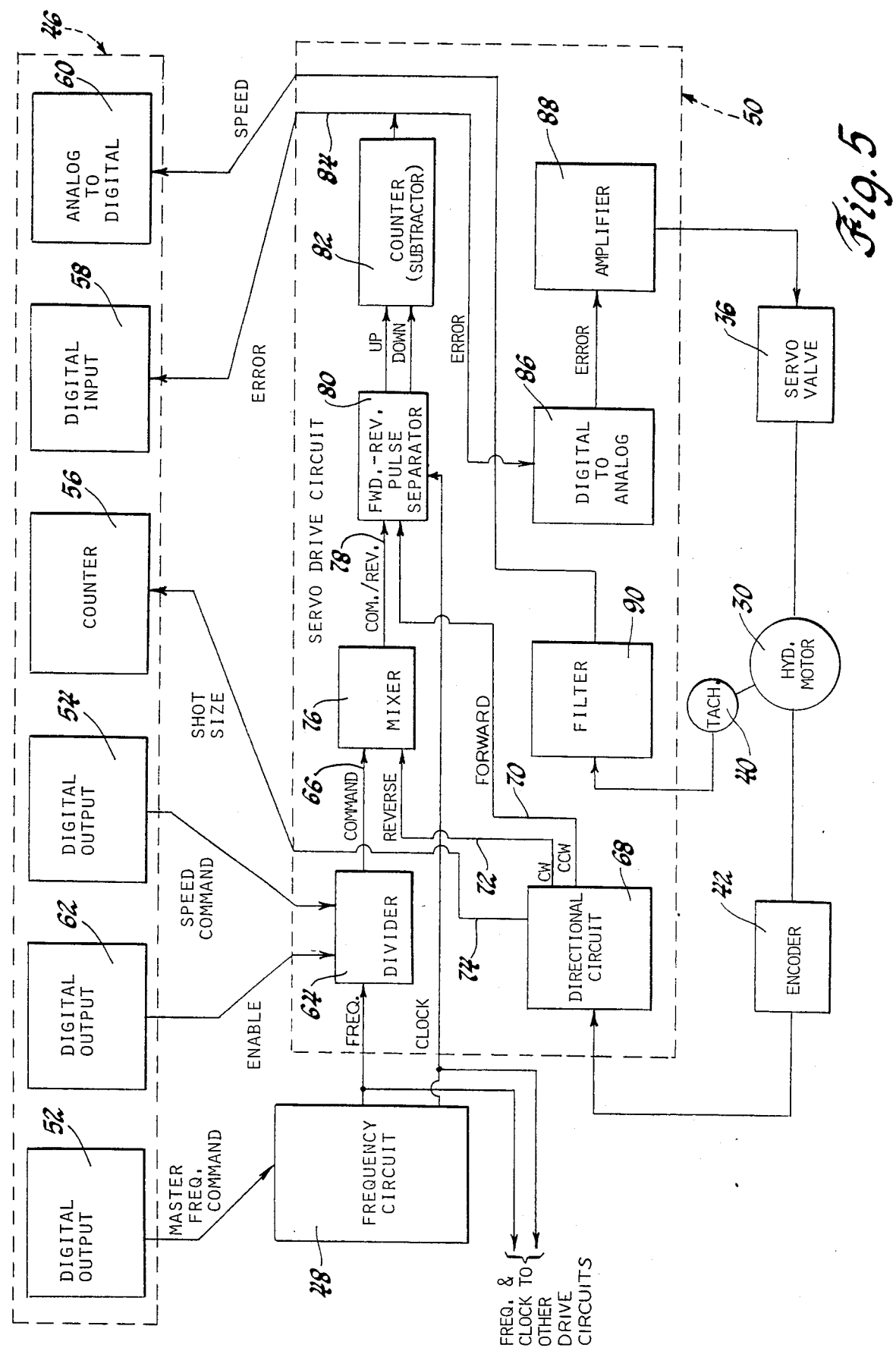
FIG. 5 is a block diagram of a portion of the controller.
Figure 6:
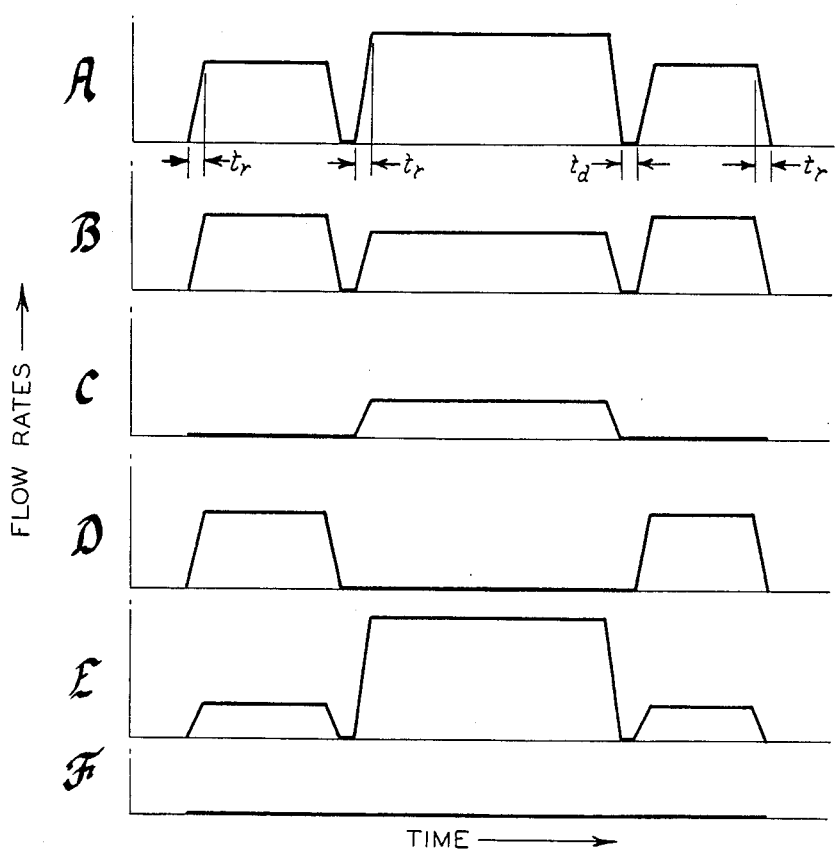
Figure 7:
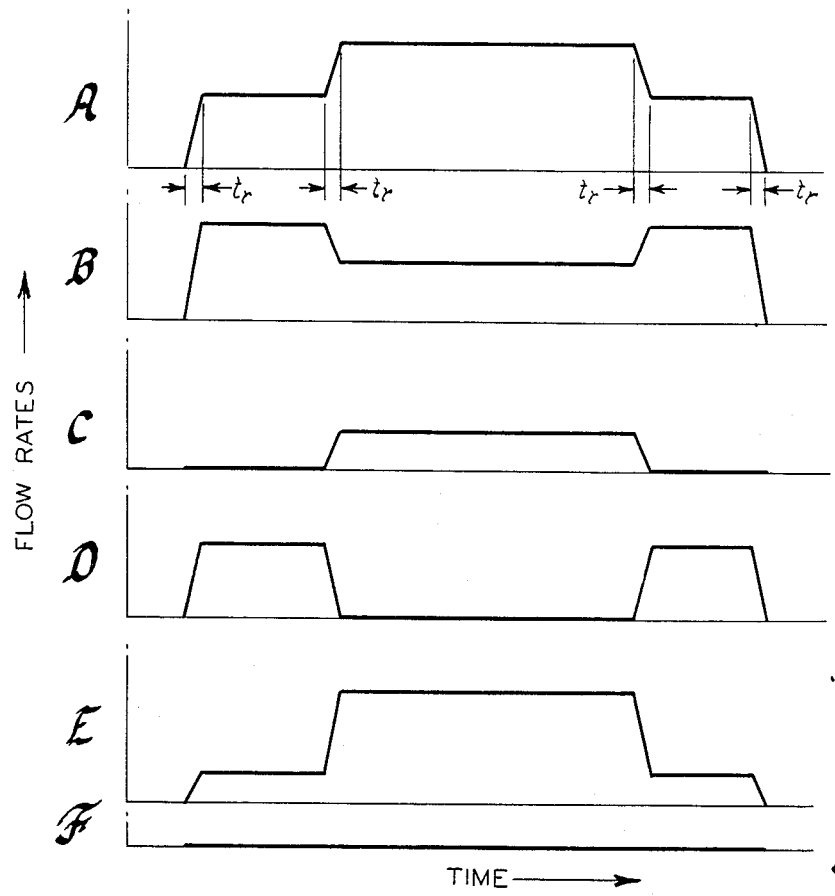
Figure 8:
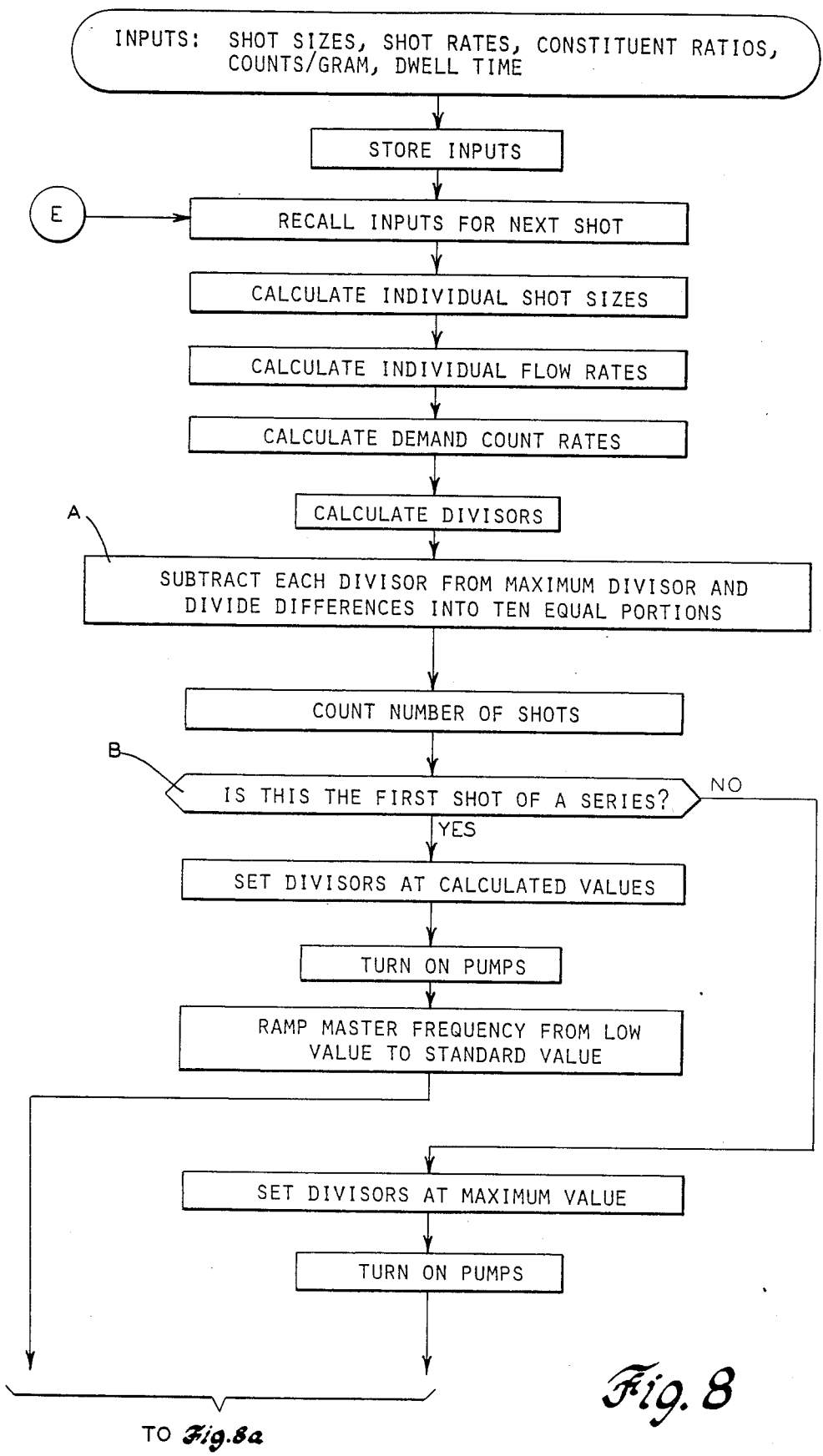
Figure 8A:
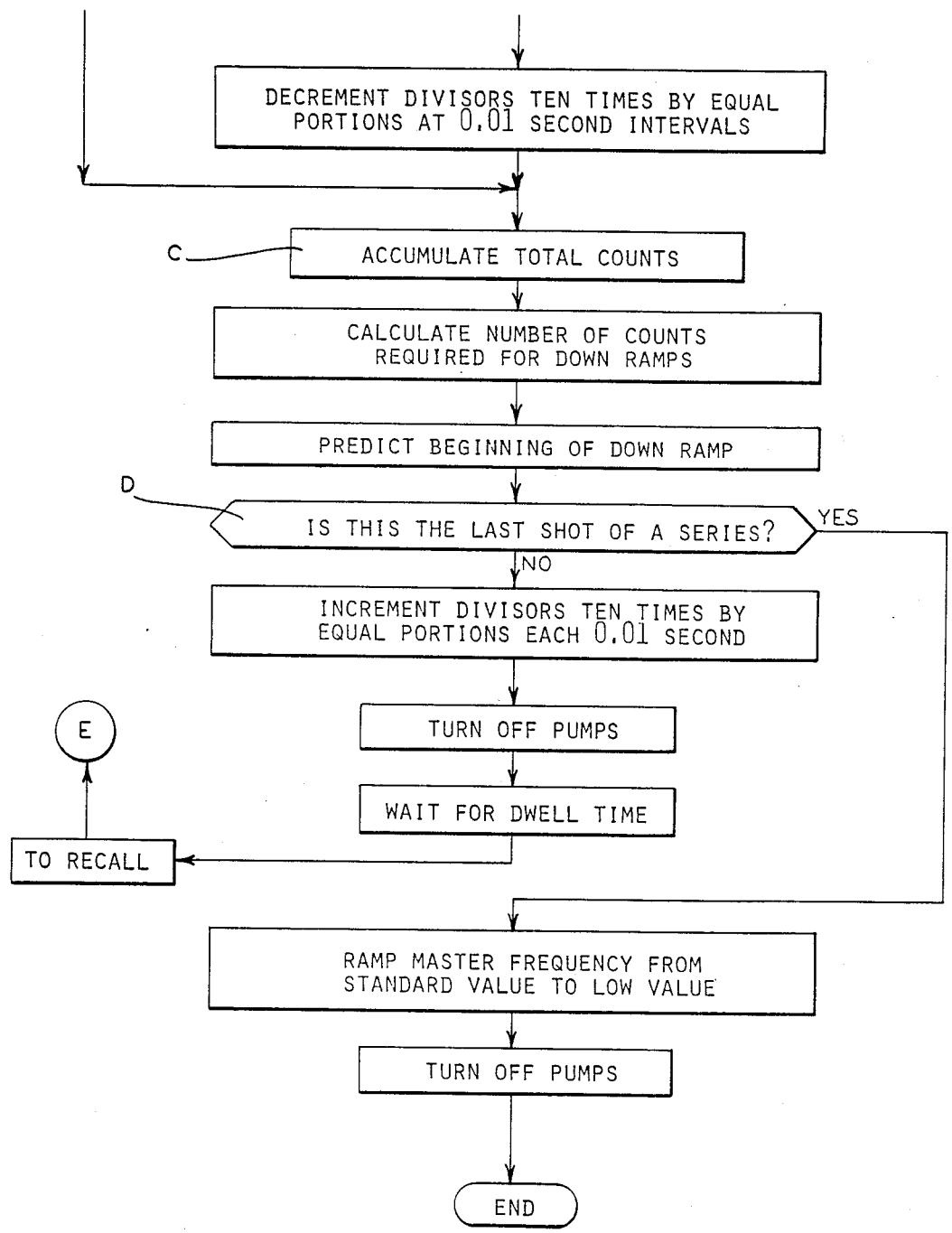

FIGS. 6 and 7 illustrate groups of waveforms representing varying flow rates which in turn represent ratios of various polymer constituents as determined by the computer and controller of FIGS. 4 and 5; and FIGS. 8 and 8a comprise a flow diagram for a program for the computer of FIG. 4.

The invention is described herein in terms of the manufacture of polyurethane foam automotive seats, however the method and apparatus of the invention applies to the manufacture of polymer articles especially where varying polymer properties are required in an article and is also useful where different polymer mixtures are to be applied to successive molds.

In foam automobile seats, it is desirable to alter the hardness and density of the foam for various seat styles and applications. In general the foam used for seat cushions is firmer and more dense than foam used in seat backs. Optimum seat comfort requires that a portion of a cushion or a back be harder or softer than another portion. The wide range of variables necessary to accommodate these differing requirements can be derived from six independent material streams properly combined. Thus, a six component system is described herein but it is apparent that a larger or smaller number of components may be used without departing from the spirit of the invention. For the urethane foam seat application one constituent is isocyanate which serves as the reactive component. Another constituent is the polyol and additives necessary to produce foam in a density range used for seat cushions and another constituent contains the polyol and additives to produce foam for seat backs. Two further constituents are pure soft polyol and pure hard polyol. The sixth constituent is a fluorocarbon blowing agent. The flow rate of each constituent is substantially infinitely variable so that the exact hardness/density combination can be achieved. In addition, each flow rate can be changed extremely rapidly so that the resulting polymer mixture can be changed almost instantaneously.

Figure 1:
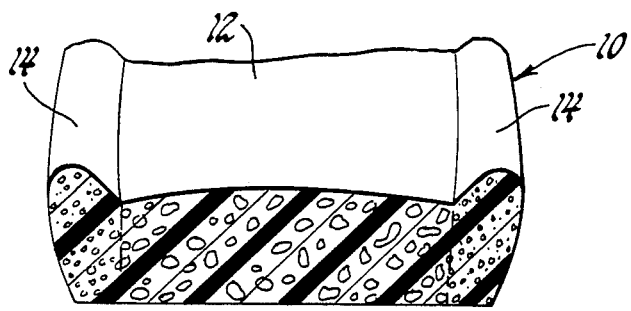
FIG. 1 is a cross-sectional view of a urethane foam automobile bucket seat cushion illustrating an application of the subject invention.
Figure 2:
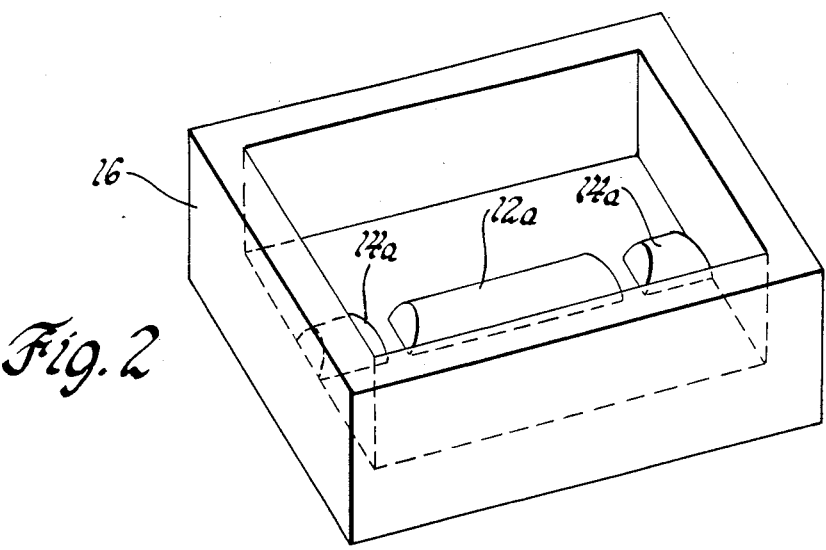
FIG. 2 is an isometric view of a mold charged with a polymer mixture for making the article in FIG. 1.

FIG. 1 illustrates a cross section of an automotive bucket seat cushion 10 having a relatively soft center support 12 and a lateral wing 14 on each side of harder foam material to provide firm lateral thigh support. Thus, one mixture of material is used for the two wings 14 and a second mixture is used for the center 12. The two materials are foamed in a mold simultaneously so that the wings and center portion are continuous and form an integral structure. As seen in FIG. 2 the lower half of the mold 16 for molding the seat cushion 10 has deposited therein three separate shots of polymer mixture identified as shots 12a in the center and 14a on either side and spaced therefrom which when foamed with the mold top (not shown) in place will form the wings 14 and center 12 of the cushion. In accordance with the present invention the two types of material are discharged into the mold from a single nozzle in the sequence 14a, 12a, 14a, so that the polymer mixture changes twice during the charging of the mold 16.

Figure 3:
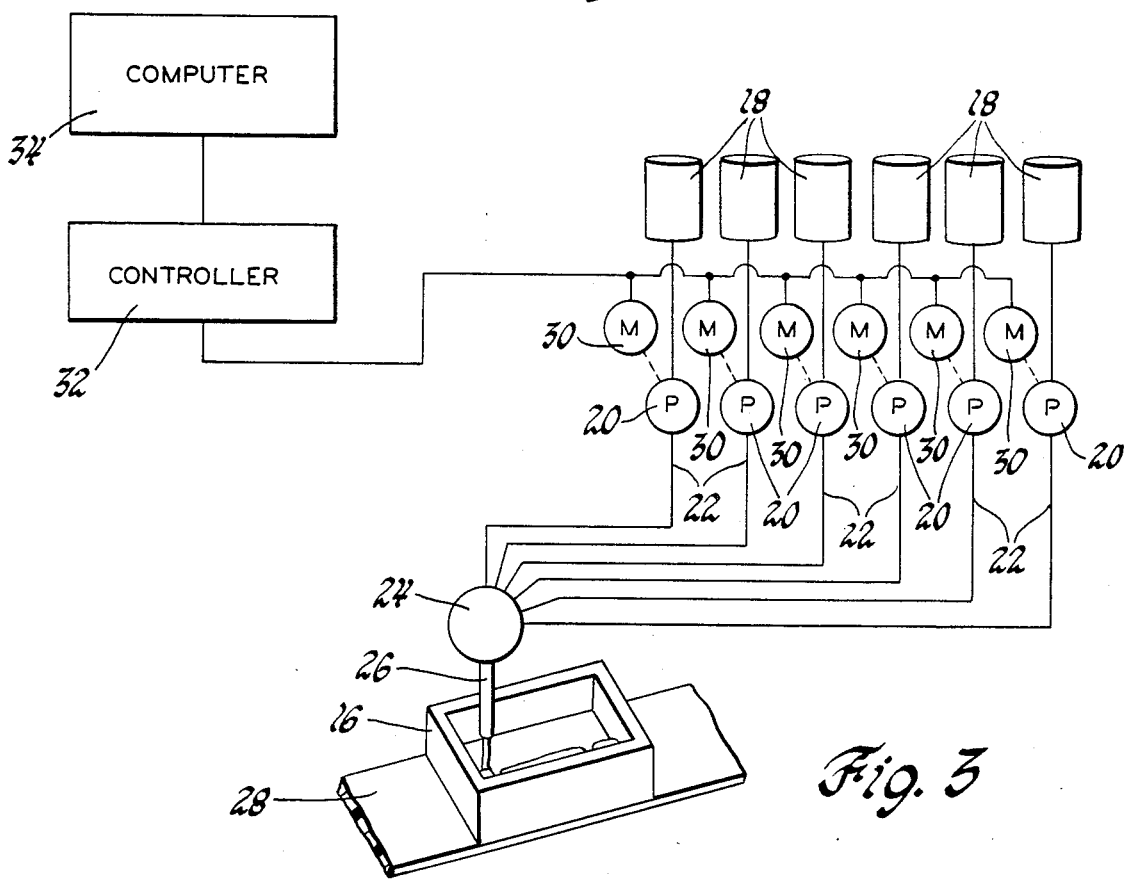
FIG. 3 is a diagram of a computer controlled chemical blending system according to the invention for dispensing foamable mixtures to molds.

The polymer blending system as shown in FIG. 3 comprises six containers 18, one for each constituent identified above, and each is connected through a pump 20 and feed line 22 to a mixing head 24 where the separate streams of material are blended and emitted through a discharge nozzle 26 into a mold 16 which is carried past the discharge nozzle by a conveyor 28. Each pump 20 is driven by a motor 30 which has its speed and hence the pump output controlled by a controller 32 which in turn has its operation controlled by a computer 34. As shown in FIG. 4 which schematically illustrates two of the six pumps 20, the motors 30 are hydraulic motors each controlled by a servo valve 36 coupled to a single hydraulic source 38. An analog tachometer 40 and a digital encoder 42 are mechanically coupled to each motor/pump combination to provide feedback signals to the controller 32 indicating pump speed and the amount of pump rotation. The encoder 42 preferably produces 1,000 pulses per revolution. The pumps are highly accurate positive displacement chemical pumps so that the tachometer signal as well as the encoder pulse rate are accurate representations of material flow rate and in addition the cumulative encoder pulses generated in a given period is an accurate indication of the cumulative amount of material delivered during that period.

As further shown in FIG. 4 the control system comprises a computer such as a Hewlett-Packard HP1000 mini-computer 34 which is coupled to input/output interface equipment 46 such as a Hewlett-Packard Multi-Programmer. The interface is tied to a master frequency circuit 48 which provides a common pacing signal or master frequency, and to servo drive circuits 50, one for controlling each pump. The interface 46 comprises a group of several circuit cards each having a particular interface function. A master digital output card 52 is connected to the master frequency circuit 48 and supplies thereto a digital signal which controls the frequency which is sent out to all the servo drive circuits 50. For each servo drive circuit 50 the interface 46 contains a digital output card 54, a counter card 56 to receive encoder pulses from the servo circuit, a digital input card 58 which receives an error signal from the servo circuit, and an analog/digital card 60 for receiving the tachometer signal from the servo circuit 50. At least one digital output card 62 for supplying an enable signal to each servo circuit is included in the interface 46. Other cards, as needed, may be included.

The interface 46 is shown again in FIG. 5 as is the frequency circuit 48 and a detailed block diagram of a servo drive circuit 50, along with the associated servo valve 36, hydraulic motor 30, tachometer 40 and encoder 42. The digital output 52 sends to the frequency circuit 48 a digital signal which is the master frequency command. Typically the master frequency output by the frequency circuit 48 is one megahertz. There are occasions when deviations from this standard master frequency are desirable. For example, if one or more constituents are to be supplied at an exceptionally low flow rate the master frequency can be reduced to facilitate the programming of lower flow rates. As another example, if conveyor speed varies making it desirable to vary the discharge rate of the mixture to the mold, then the master frequency can be appropriately altered by the computer command. In addition, it has been our practice to begin each initial shot to the mold at a low flow rate and gradually increase the rate to a desired value. To accomplish this the master frequency command is swept through a series of 10 commands of increasing value in a period of 0.1 seconds thereby simultaneously and gradually increasing the flow of all constituents being used during that particular shot. To terminate the last shot of a series the master frequency is decreased in a similar manner to simultaneously and gradually terminate the flow of all the constituents. The frequency circuit 48 comprises a digital to voltage converter responsive to the master frequency command from the digital output 52 and a voltage to frequency converter to produce the master frequency corresponding to the digital command. The frequency circuit 48 also produces a clock output. The master frequency and the clock outputs are coupled to each of the servo drive circuits 50.

A typical servo drive circuit 50 is shown in FIG. 5. Within that circuit a divider 64 receives the master frequency signal from the frequency circuit 48, the enable signal from the digital output 62 and a divisor from the digital output 54. Thus the divider produces an output on line 66 which is a frequency equal to the master frequency divided by the divisor. The output frequency on line 66 is termed the "demand count rate". Since the computer determines both the master frequency and the divisor it directly controls the demand count rate. The chief function of the servo drive circuit 50 is to control its associated pump to ensure that the constituent flow rate is proportional to the demand count rate. This is accomplished by detecting the actual flow rate by the encoder 42. The encoder output frequency is called the measured count rate. That signal is fed to a directional circuit 68 which transmits forward and reverse pulse signals on lines 70 and 72 respectively. The reverse pulses can occur during idle conditions of the pump where some mechanical drift would allow minor reverse motion. Another output 74 of the directional circuit transfers the net forward count pulses to the interface counter card 56 which accumulates a value proportional to the amount of material delivered by the pump. Mixer circuit 76 combines the demand count rate signal on line 66 and the reverse pulse signal on line 72 to provide an output on line 78 which along with line 70 provide inputs to a forward/reverse pulse separator circuit 80. The latter circuit is controlled by a clock frequency and transmits the forward and reverse pulses to an up/down counter 82. The separator circuit 80 assures that the up and the down pulses input to the counter are sequenced in time so that every pulse is registered by the counter which serves as a subtractor. Essentially the counter 82 compares the demand count rate/reverse pulse signal of line 78 with the measured forward signal pulse by pulse to determine any difference between the two sets of pulses. Any difference or error is output on line 84 and is operated upon by a digital to analog converter 86 and then an amplifier 88 which drives the servo valve 36 to a degree determined by the error magnitude thereby closing the servo control loop. The loop has sufficiently high gain that the measured count rate closely tracks the demand count rate thereby resulting in very small errors. In actual practice it has been found that the error on line 84 is on the order of 3 or 4 pulses even though the count rates may be on the order of a few hundred or a few thousand pulses per second. The error on line 84 is coupled to the interface digital input 58 so that the computer can internally compare the error with a preset tolerance value and if the value is exceeded the computer terminates the system operation as though the shot had been completed. Another check on the operation utilizes the analog tachometer 40 output signal which is fed through a filter 90 and then transmitted to an analog to digital converter 60 in the interface 46. The computer compares that speed signal with the demand count rate and if there is a large variance the computer terminates the system operation.

To provide examples of the system operation as well as the computer programming, FIG. 6 illustrates graphically how the constituent ratios may change with time to form the three shots of polymer mixture shown in FIG. 2 wherein the first and third shots 14a have ratios yielding certain foam properties while the second shot 12a has different constituent ratios and different properties. The graphs show constituent flow rates versus time. Thus, constituent A flows at a greater rate for the second shot than it does for the first and third, whereas constituent B flows at a lesser rate for a second shot than for the first and third shots. Constituent C, on the other hand, has zero flow for the first and third shot but for the second shot has a flow rate which is smaller than either A or B. Constituent D flows at the same rate as A during the first and third shots but has zero flow for the second shot. Constituent E, like A, has a greater flow rate for the second shot than for the other two but the variation between the high and low rates is greater than in the case of A. Constituent F is not utilized at all. As also shown in FIG. 6, each shot when it is initiated and terminated changes gradually between its zero and its nominal operating value. These initial and terminal ramps allow for accurately controlled pump acceleration and deceleration so that each pump is brought up to its desired speed or brought back down to zero speed in synchronism with the other pumps thereby maintaining the same constituent ratios even in the transition stages of each shot. In practice the ramp times $t_r$ equal 0.1 second and since the system is digitally controlled the ramps take place in stepped increments of preferably 10 steps in each ramp. However, the pump inertia effectively filters these steps to produce a linear change in flow rate as illustrated. The computer controls the ramping by controlling the demand count rate that in turn is controlled by changing the master frequency or the divisor inputs to the divider 64. That is, the master frequency can be maintained at a standard value while the divisor changes in the ramp fashion from its highest value representing a low flow rate to the value corresponding to the desired flow rate of that constituent. In a practical system the divisor is not large enough to cause a zero flow rate, so the pumps are turned on and off at the beginning and end of each shot by controlling the enable input to the divider 64. Alternatively, the ramps may be generated by sweeping the master frequency from zero to its standard value or vice versa and holding the divisors constant for the duration of each shot. In either case the ramps are executed synchronously. In the preferred embodiment of the invention the initial ramp of the first shot and the terminal ramp of the third shot are effected by changing the master frequency whereas the remaining ramps are controlled by changing the divisor. A further feature evident in the waveforms of FIG. 6 is a dwell time $t_d$ between adjacent shots. The dwell time $t_d$ typically may be on the order of 0.1 second or more, however, zero dwell time is a viable option.

FIG. 7, like FIG. 6, represents the flow rates of several constituents during the blending of chemicals for three consecutive shots. FIG. 7 is different from FIG. 6 in that the transition between adjacent shots is accomplished without stopping the flow of each constituent. Rather the change of flow rate of each constituent is accomplished by a direct ramp change from the old value to the new value. This is accomplished by linearly changing the divisor in several steps over the transition period. In this manner the transition is made more quickly than in the case of FIG. 6 but does not allow a dwell time between shots and during the transition period the ratios of the various constituents is a changing blend of ratios of the adjacent shots.

The following tables illustrate the values that must be input to the computer and other values to be calculated by the computer in order to establish the flow rates for one shot. This example assumes a condition requiring 4 different constituents A-D for the polymer mixture and further assumes a standard master frequency of 1 megahertz.

TABLE 1

| Input Values | | Calculated Value |
| --- | --- | --- |
| Shot Size | Rate | Pour Time |
| 1000 g | 1000 g/s | 1 s |

As shown in Table 1, the shot size in grams and the flow rate in grams per second of the total mixture must be entered into the computer. From that information the pour time is readily calculated.

TABLE 2

| | Input Values | | Calculated Values | | | |
| --- | --- | --- | --- | --- | --- | --- |
| | Ratio | Counts/ gram | Individual Shot Size | Individual Rate | Count Rate | Divisor |
| A | 30 | 5 | 300 g | 300 g/s | 1500 c/s | 667 |
| B | 20 | 5 | 200 g | 200 g/s | 1000 c/s | 1000 |
| C | 10 | 5 | 100 g | 100 g/s | 500 c/s | 2000 |
| D | 40 | 5 | 400 g | 400 g/s | 2000 c/s | 500 |

In Table 2 for each of 4 pumps the ratio or more accurately the relative number of parts of each constituent in the mixture must be entered. In this particular example the total constituents add up to 100 parts to simplify the ensuing calculations. It is also required to enter the number of encoder output counts for each gram of material flowing through each pump. This depends upon the pump characteristics as well as the density of the constituent. In the given example 5 counts per gram has been assigned to each constituent. From all the input data the computer then calculates the individual shot size, the individual flow rate in grams per second of each constituent, the demand count rate in counts per second and the divisor necessary to achieve the desired count rate. The divisor is calculated by dividing the master frequency, 1 megahertz, by the count rate. In practice the necessary input data for many different shots are stored in the computer memory and then are appropriately recalled by the computer at the time of charging a particular mold.

FIGS. 8 and 8a together show a flow chart representing the computer program for controlling the urethane polymer mixtures for a number of shots in series as shown in FIG. 6 with a dwell time between adjacent shots. According to this program the initial ramp of the first shot and the terminal ramp of the last shot are controlled by ramping the master frequency while the remaining ramps are controlled by ramping the divisors. Referring to FIGS. 8 and 8a, the first several steps include inputting the data as shown in Tables 1 and 2 for several different shots as well as the dwell time between shots and calculating the values set forth in Tables 1 and 2. At step A each divisor is divided into ten increments to prepare for ramping the divisors. At step B if the forthcoming shot is the first of a series the divisors are set at the calculated values, the pumps are turned on and the master frequency is ramped from a low value to the standard value. If it is not the first shot of the series then the divisors are set at a maximum value to call for very slow pump rotation, the pumps are turned on and then the divisors are ramped down to the calculated values. At step C the total counts are accumulated throughout each shot to determine how near the shot is to completion. Then to predict when the down ramps should begin the number of counts that will occur during the down ramp is calculated and that value is subtracted from the total counts required for the individual shot size thereby determining the count value at the beginning of the down ramp. After step D if the current shot is not the last one of a series, then the divisors are ramped down and the pumps turned off and they remain off for the dwell time. Thereafter the program loops back to the recall inputs step E for the next shot. If this is the last shot of the series, then the master frequency is ramped down to low value and the pumps turned off to terminate the charging of the mold and to end the program.

It will thus be seen that according to this invention a method and apparatus are provided for forming polymer mixtures with a high degree of accuracy and changing the mixtures very rapidly so that during the charging of a mold different mixtures yielding different product properties can be incorporated in a single mold, this being accomplished by a single blending system having one mixing chamber and one discharge nozzle.

The embodiments of the invention for which an exclusive property or privilege is claimed are defined as follows:

1. The method of producing a molded polymer article having different properties in different regions of the article comprising the steps of delivering several streams of hardenable fluid precursor constituents at first predetermined rates to a mixing head for combining in a first mixture and discharge into a portion of a mold cavity corresponding to a first article region, the mixture being suitable to yield a polymer with a first property, and then changing the relative rates of the streams of constituents and delivering several streams of fluid constituents at second predetermined rates to the mixing head to obtain a second mixture discharging into another portion of the mold cavity corresponding to a second article region, the second mixture being suitable to yield a polymer with a second property, whereby the regions of the molded article containing the first mixture will have the first property and the regions containing the second mixture will have the second property.

2. The method of producing a molded polymer article having different properties in different regions of the article comprising the steps of delivering several streams of fluid constitutents at programmed rates for combining in a mixing zone and discharging the resultant mixture into parts of a mold cavity, the property of the resultant polymer being dependent on the ratio of the constituents, changing the relative delivery rates of the constituents to the mixing zone at least once during the charging of a mold to obtain different mixtures containing different ratios of constituents to establish a different polymer property, and discharging each mixture from the mixing zone into a determined part of the mold cavity so that the molded article will have predetermined property variations.

3. The method of sequentially forming a plurality of shots of polymer which together comprise the charge to a mold cavity wherein each shot comprises a mixture of hardenable precursor constituent different in ratio or in kind from the mixture of a contiguous shot for producing a molded article having different properties in different regions, comprising the steps of forming the first shot by (a) establishing for each constituent a demand count rate representing the desired rate of flow of the constituent to a mixing head, (b) initially producing demand count rates starting at a low value and simultaneously and gradually increasing the demand count rates to the established rates for the several constituents, (c) producing for each constituent a measured count rate representing the actual rate of flow of the constituent, and (d) controlling the flow of each constituent to cause the measured count rate to substantially follow the demand count rate;

forming each subsequent shot by establishing new desired count rates as required for the mixture of such shot and changing the demand count rate simultaneously and gradually to the new desired count rates for the several constituents, and terminating the final shot by simultaneously and gradually decreasing the demand count rates to zero to stop the flow of the constituents.

4. The method of sequentially forming a plurality of shots of polymer as claimed in claim 3 wherein a transition from any current shot to a subsequent shot is made by gradually decrementing the demand count rates for the current shot to zero, optionally dwelling at zero demand count rates for a short time, and then simultaneously and gradually incrementing the demand count rates to the new desired values for the several constituents whereby the mixture flow for each shot stops before the next shot begins and the mixture for each shot maintains a uniform ratio of constituents through the period of each shot.

5. The method of sequentially forming a plurality of shots of polymer as claimed in claim 3 wherein the transition from any current shot to a subsequent shot is made over a short transition period by gradually and simultaneously changing the demand count rates from the old to the new desired rates in a substantially linear fashion so that the polymer mixture flows continuously to the mold cavity and during the transition period the mixture is a blend of the mixtures of the contiguous shots.

6. Apparatus for issuing sequential shots of polymers of varying constituent content for forming articles of varying properties comprising containers of constituents, a mixing head, a nozzle for discharging shots of polymer mixture from the mixing head, controllable pumps for supplying the constituents from the respective containers to the mixing head, and control means comprising feedback means responsive to the flow of each constituent producing a pulsed signal for each constituent having a count rate proportional to actual flow rate, a general purpose computer for receiving and storing input data specifying the constituent amounts for each shot of polymer, the computer being programmed to:

(a) establish for the first shot of a sequence a demand value for each constituent representing the desired rate of flow of the constituent to the mixing head, (b) produce initial demand values representing low flow rates and gradually change the demand values from the initial values to the established values for the several constituents, (c) establish for each subsequent shot new desired values as required for the mixture of such shot and change the demand values simultaneously and gradually to the new desired demand values for the several constituents, and (d) terminate the final shot of the sequence by simultaneously and gradually changing the demand values to values representing low flow rates and then generating a flow stop signal; and a controller coupled to the feedback means and to the computer and responsive to the pulsed signal and signals corresponding to the demand values for each constituent to control each pump to deliver the desired amount of constituents to the mixing head so that the mixture discharged from the nozzle is established by the computer and the mixture ratio and/or flow rate changes when the various demand values change.

7. Apparatus as claimed in claim 6 wherein the controller includes a frequency circuit for producing a master frequency signal, and a plurality of servo circuits coupled to the computer, to the feedback circuit, and to the frequency circuit for controlling the respective pumps, each servo circuit being responsive to the master frequency signal and to signals corresponding to the demand value for its respective constituent to produce a demand count rate representing the desired flow rate, each servo circuit having means responsive to the pulsed signal and the demand count rate for controlling each pump to product flow rate substantially equal to the desired flow rate.

8. Apparatus as claimed in claim 7 wherein the frequency circuit is coupled to the computer and includes means responsive to computer commands for establishing the master frequency signal and for changing the master frequency in ramp fashion whereby the range of available count rates is established and the demand count rate can be changed in ramp fashion to facilitate the gradual changing of initial and terminal flow rates.

* * * * *